US005448486A

United States Patent [19]

Watland

[11] Patent Number: 5,448,486

[45] Date of Patent: Sep. 5, 1995

[54] ORTHOGONAL POLAR COORDINATE SYSTEM TO ACCOMMODATE POLAR NAVIGATION

[75] Inventor: Donald R. Watland, Peoria, Ariz.

[73] Assignee: Honeywell Inc., Minneapolis, Minn.

[21] Appl. No.: 54,129

[22] Filed: Apr. 29, 1993

[51] Int. Cl.[6] .............................................. G06F 165/00

[52] U.S. Cl. .................................... 364/443; 364/445; 364/449; 73/178 R

[58] Field of Search ............... 364/443, 449, 445, 453; 73/178 R; 340/972, 973, 979

[56] References Cited

U.S. PATENT DOCUMENTS

| | | | |
|---|---|---|---|
| 2,749,035 | 6/1956 | Gray | 364/445 |
| 3,049,299 | 8/1962 | Beck | 364/445 |
| 4,104,722 | 8/1978 | Evans | 73/178 R |
| 4,930,085 | 5/1990 | Kleinschmidt | 364/449 |
| 5,172,323 | 12/1992 | Schmidt | 364/453 |

*Primary Examiner*—Gary Chin

*Attorney, Agent, or Firm*—Arthur A. Sapelli; Dale E. Jepsen

[57] ABSTRACT

A method for navigating an aircraft around the earth's polar region comprises the steps of determining if the aircraft is in one of the polar regions of the earth's traditional axis system. If the aircraft is not in one of the polar regions, aircraft parameters, including speed and heading, are calculated relative to the traditional axis system. If the aircraft is in one of the polar regions the traditional axis system is rotated to form a new axis system, such that the aircraft position in the new axis system is in an essentially rectilinear area of the new axis system. The aircraft parameters are transformed, including aircraft position, speed, and heading, into parameters relative to the new axis system. New parameters are calculated with respect to the new axis system, and then the new parameters are translated into parameters with respect to the earth's traditional axis system. Commands are calculated and out-putted, and the aircraft is steered in accordance with the commands, the commands having less error as a result of utilizing parameters generated with respect to the new axis system, thereby navigating in the polar region with greater accuracy.

7 Claims, 6 Drawing Sheets

ORTHOGONAL POLAR COORDINATE SYSTEM TO ACCOMMODATE POLAR NAVIGATION

BACKGROUND OF THE INVENTION

The present invention relates to a method of navigation, and more particularly, to a method of navigation in the earth's polar regions.

A traditional solution uses a local flat earth and rectangular coordinates which is adequate for low speed, low altitude flight (non-orbital), between 45° north latitude and 45° south latitude. However, as the aircraft moves towards either pole, the "parallel" lines of longitude begin to converge, and the assumption of a rectilinear relation between lines of latitude and longitude is no longer valid. The closer to a pole, the greater the error becomes for the traditional solution.

The method of the present invention provides a solution for determining aircraft position and heading in the polar regions by using a non-standard orientation of a polar axis system whenever the aircraft is above 45° north latitude, or below 45° south latitude. Between 45° north latitude and 45° south latitude, the aircraft position is calculated using polar coordinates aligned with the north and south pole (the traditional orientation).

SUMMARY OF THE INVENTION

Therefore, there is provided by the present invention, a method of calculating an aircraft position and heading in the earth's polar regions, thereby permitting navigating in the polar regions. The method for navigating an aircraft around a polar region of a tradition axis system, the axes of the traditional axis system being in an orthogonal relationship with respect to one another, comprises the steps of determining if the aircraft is in one of the polar regions of the traditional axis system. If the aircraft is not in one of the polar regions, aircraft parameters, including speed and heading, are calculated relative to the traditional axis system, and then proceeds to the step of calculating commands. If the aircraft is in one of the polar regions of the traditional axis system, the traditional axis system is rotated to form a new axis system, such that the aircraft position in the new axis system is in an essentially rectilinear area of the new axis system. The relationship between the traditional axis system and the new axis system is known. The aircraft parameters are transformed, including aircraft position, speed, and heading, into parameters relative to the new axis system. New parameters are calculated with respect to the new axis system, and then the new parameters are translated into parameters with respect to the traditional axis system. Commands from the parameters are calculated and outputted. The aircraft is steered in accordance with the commands, the commands having less error as a result of utilizing parameters generated with respect to the new axis system, thereby navigating in the polar region with greater accuracy.

Accordingly, it is an object of the present invention to provide a method of calculating an aircraft position and heading in the polar regions of the earth.

It is another object of the present invention to provide a method of calculating an aircraft position and heading in the polar regions of the earth thereby permitting navigation in the earth's polar region.

These and other objects of the present invention will become more apparent when taken in conjunction with the following description and attached drawings, wherein like characters indicate like parts, and which drawings form a part of the present application.

DETAILED DESCRIPTION

Referring to table 1, there is shown an error by comparing several grids, made by a change in one degree in latitude and 1 degree in longitude at several different latitudes.

TABLE 1

| Latitude | Distance of 1° Longitude | Percentage Error |
|---|---|---|
| 30° | 52.056 nm | 1.02% |
| 31° | 51.523 nm | |
| 45° | 42.503 nm | 1.76% |
| 46° | 41.755 nm | |
| 60° | 30.054 nm | 3.04% |
| 61° | 29.141 nm | |
| 75° | 15.557 nm | 6.53% |
| 76° | 14.542 nm | |
| 85° | 5.239 nm | 19.96% |
| 86° | 4.193 nm | |
| 88° | 2.098 nm | 50.00% |
| 89° | 1.049 nm | |

The error increases as the polar regions are approached because the grid changes, i.e., what once was a square (around the equator) now becomes a triangle. Thus, as can be seen from the table, as the polar region is approached the error increases. Similarly, the heading (relative to the north pole) changes in the polar region even though no direction changes are made by an aircraft flying in the polar region. As can be seen from table 1, at 30°/31° latitude, the difference in the respective longitude results in a 1.02% error from a "rectangle grid system". At 60 degrees latitude there is about a 3% error between a one degree difference in latitude. Near the poles the error approaches 50%, until, at the pole the error "blows up".

In the preferred embodiment of the present invention, the lines of longitude and latitude are aligned 90 degrees to those lines in the traditional system. A coordinate system, in the preferred embodiment of the present invention, is made by aligning the alternate polar axis in the plane of the Equator. This alternate pole of the preferred embodiment is located on the equator near the island of Sumatra (at a traditional latitude of 0° and east 90° longitude), and is thereby referred to herein as the "Sumatran" axis system with a "Sumatran pole" as opposed to the traditional system with a North pole. This alternate set of coordinates is selected when near the polar regions thereby having a rectilinear local axes system and eliminating the converging lines of longitude of the traditional axes system. In the preferred embodiment of the present invention, the alternate Sumatran coordinates are utilized beyond 45° latitude (i.e., when the aircraft is above or below 45° latitude), thereby resulting in a positional error which is less than one (1) percent.

Figure 1:
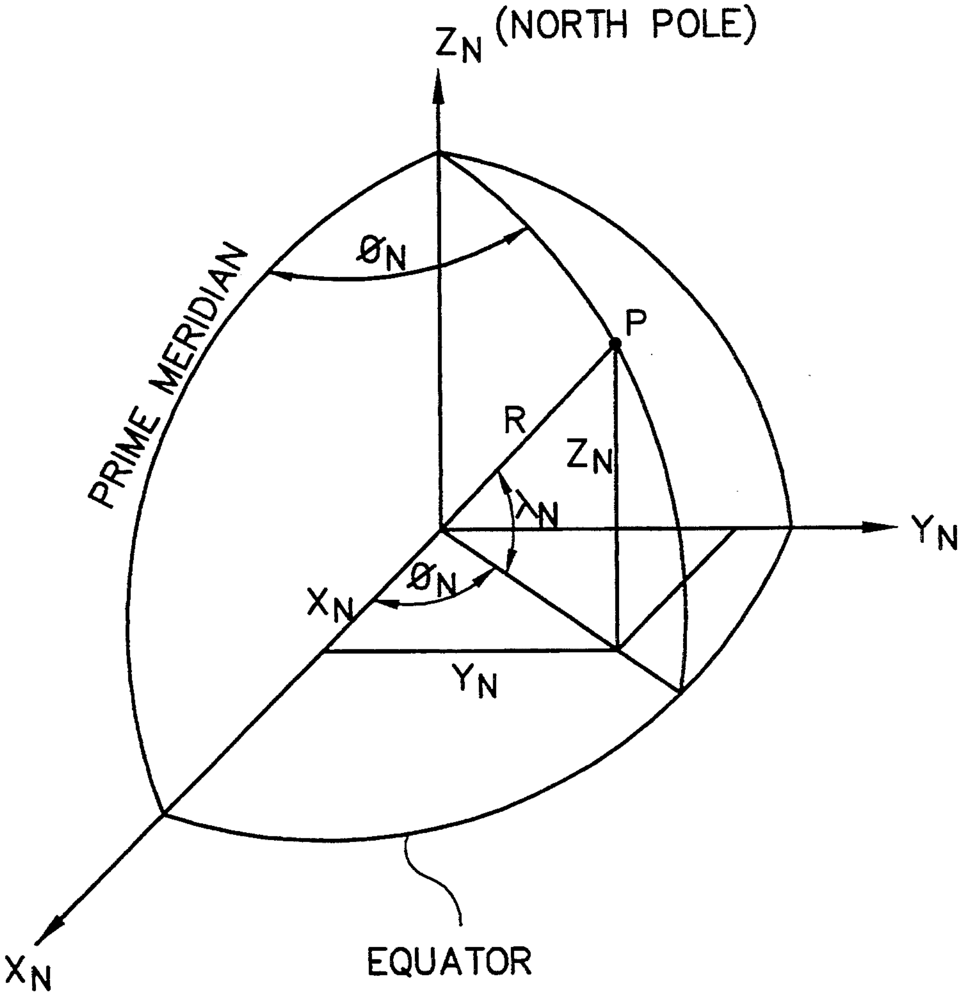
FIG. 1 shows a traditional polar axis system.

Referring to FIG. 1, there is shown the traditional polar axes system. Point P is a position above the earth's surface of height h in which an aircraft is flying and having a velocity and heading relative to the north pole.

Figure 2:
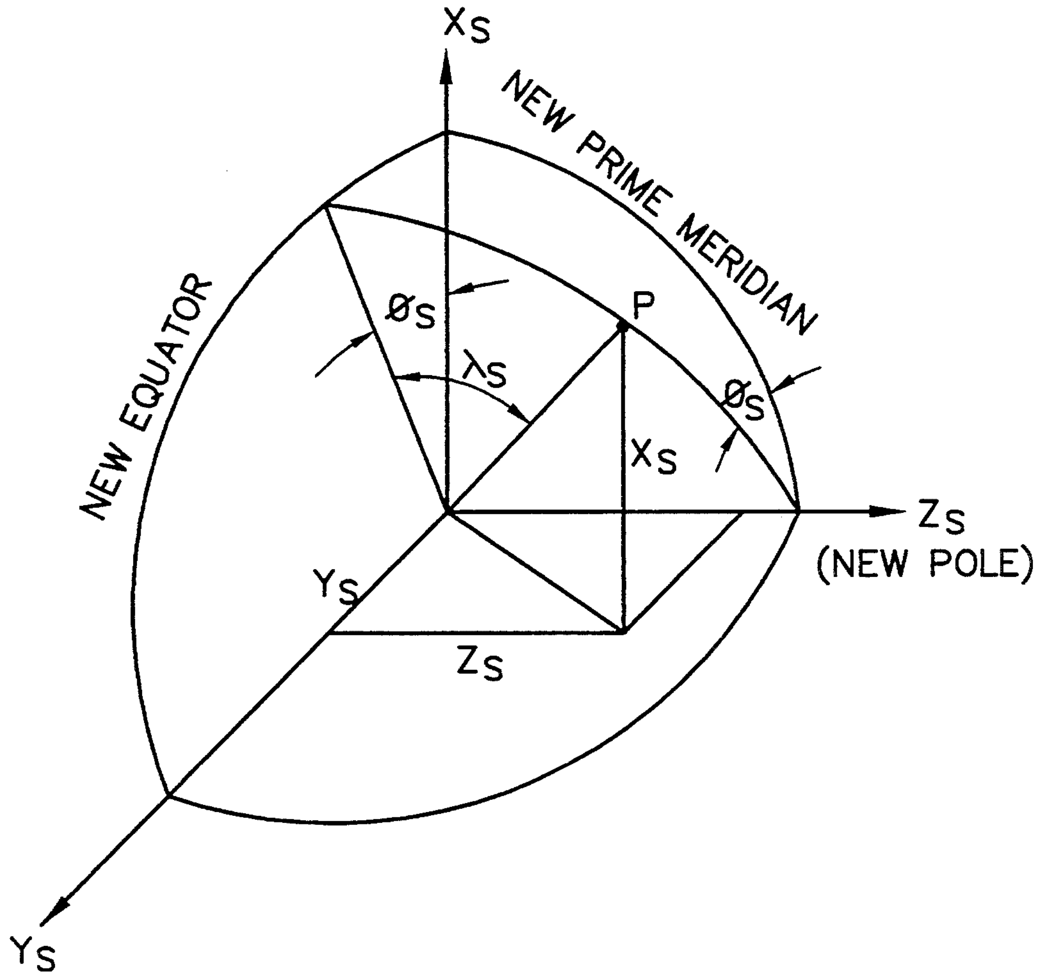
FIG. 2 shows an orientation of a related axis system of the orthogonal Sumatran axis of the preferred embodiment.

Referring to FIG. 2, there is shown the orientation of the orthogonal Sumatran axis system of the preferred embodiment. By rotating the $Z_N$axis into $Y_N$, and rotating $X_N$into $Z_N$, the Sumatran axis system is formed. (It will be obvious to those skilled in the art that a variety of rotations, and thus transformations, can be made to achieve the same or similar result).

Figure 3:
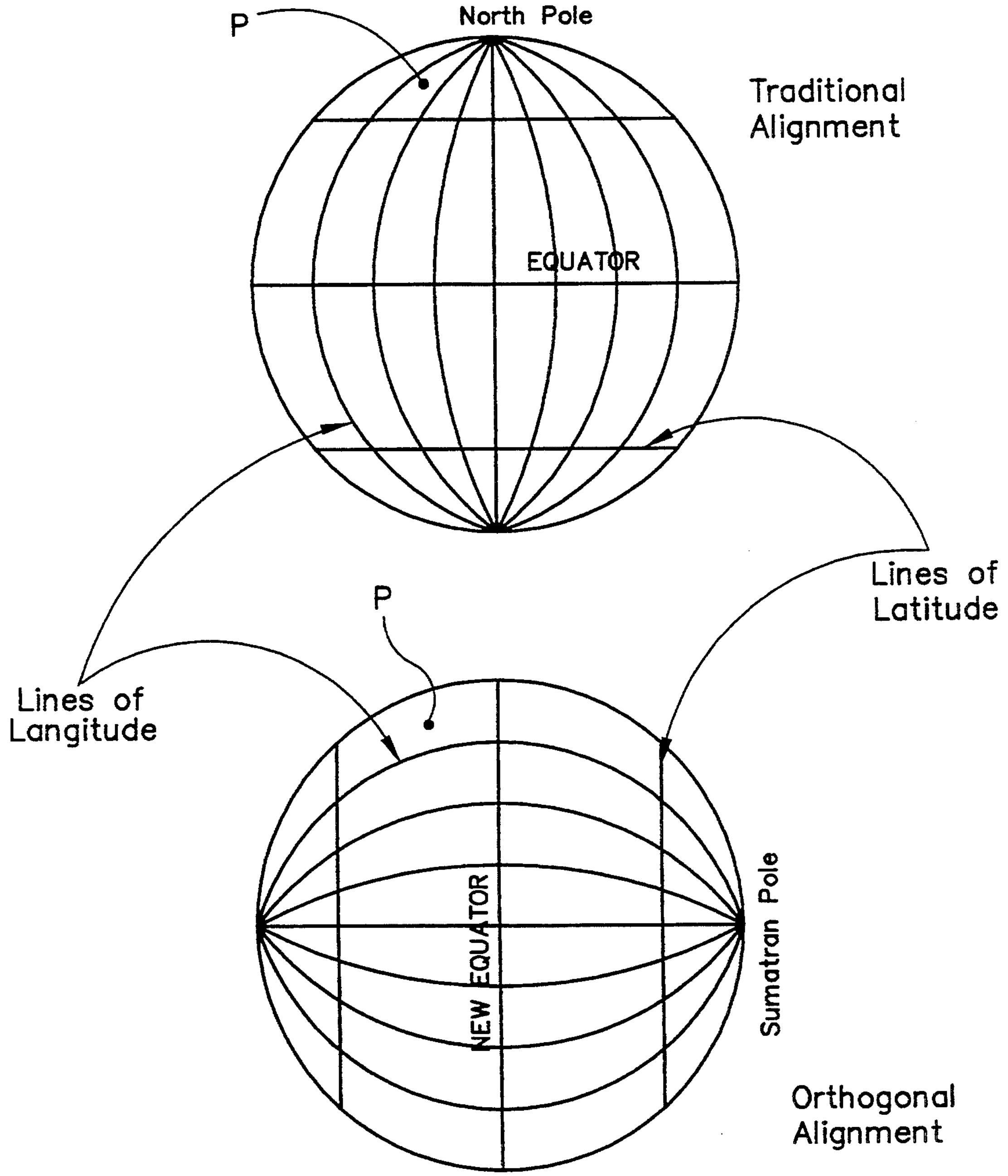
FIG. 3 shows the effect of rotating the axis system of FIG. 1 to the Sumatran axis system of the preferred embodiment.

Referring to FIG. 3, the effect of the rotation of the axes can be seen. Point P in the traditional axis system is in the polar region and above the 45° latitude line, i.e., outside the rectilinear region where the errors are relatively high. The same point P in the Sumatran axis system is in region near the "equator" (new equator) of the orthogonal alignment system (i.e., the Sumatran axis system). In the Sumatran axis system, the errors are much less than 1% as discussed above.

The initial position of an aircraft flying in the earth's airspace, specified in traditional coordinates, is as follows:

$\lambda_N$=Latitude
$\rho_N$=Longitude
$h_N$=Altitude
R=Earth radius (at equator)
$_N$=Heading (relative to North pole)

The aircraft position, relative to the Sumatran coordinates, can be calculated by the following transformation:

$$=(R+h_N)\cos\lambda_N\cdot\cos\rho_N$$

$$Y_N=(R+h_N)\cos\lambda_N\cdot\sin\rho_N$$

$$Z_N=(R+h_N)\sin\lambda_N$$

Assign the Sumatran rectangular coordinates as follows:

$$X_S=Z_N$$

$$Y^S=X_N$$

$$Z^S=Y_N$$

Calculate the Sumatran polar coordinates as follows:

$$\lambda_S=\arctan\left[\frac{Z_S}{(X_S^2+Y_S^2)^{\frac{1}{2}}}\right]$$

$$\psi_S=\arctan\left(\frac{Y_S}{X_S}\right)$$

$$h_S=h_N$$

Figure 4:
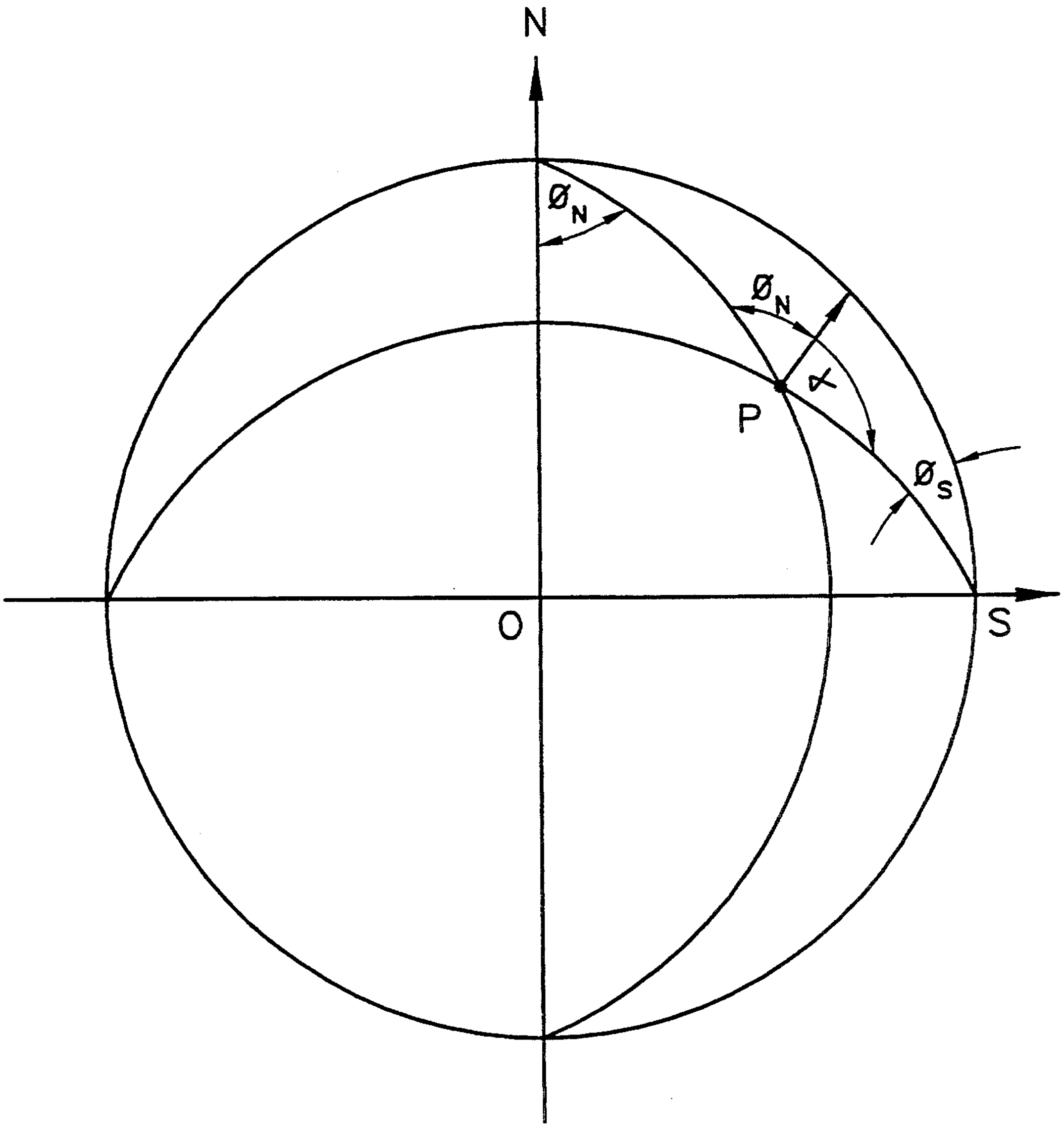
FIG. 4 shows the relationships between the two axis systems to determine alternate heading relative to the new axis system.

The above transformation establishes the aircraft's position in both the traditional and Sumatran axis systems. The alternate heading (relative to the Sumatran pole) can be found using spherical trigonometry, as referenced in FIG. 4.

Arcs NP, SP, and NS lie on great circles, each being a line of longitude in either the traditional or the Sumatran coordinate system. From FIG. 4, establish the following angles:

$$P=NPS=\alpha+\psi_N \qquad \alpha=P-\psi_N$$

$$N=PNS=\pi/2-\rho_N \quad \psi_S=2\pi-\alpha=2\pi-P+\psi_N$$

$$S=PSN=\rho_S$$

Using the spherical law of sines:

$$\frac{\sin P}{\sin\left(\frac{NS}{R}\right)}=\frac{\sin S}{\sin\left(\frac{NP}{R}\right)}$$, where *NS* and *NP* denote angles whose vertices lie at the sphere's center.

$$\sin P=\frac{(\sin S)\sin\left(\frac{NS}{R}\right)}{\sin\frac{NP}{R}}$$

The length of a longitudinal arc, with one end at the North pole is given by the following equations:

$$\psi=R\left(\frac{\pi}{2}-\lambda_N\right)$$

It follows that:

$$\overline{NS}=\frac{\pi R}{2},\ \overline{NP}=\left(\frac{\pi}{2}-\lambda_N\right),\ \overline{SP}=\left(\frac{\pi}{2}-\lambda_S\right)$$

(The bar,—, denotes arc length.)

Substituting the arc lengths into the equation for sinP:

$$\sin P=\frac{\sin\rho_S\cdot\sin\frac{\pi}{2}}{\sin\left(\frac{\pi}{2}-\lambda_N\right)}$$

$$\sin P=\frac{\sin\rho_S}{\cos\lambda_N}$$

Using the spherical law of cosines, an expression for cosP can be found:

$$\cos(NS)=\cos(NP)\cos(PS)+\sin(NP)\sin(PS)\cos P$$

$$\cos P=\frac{\cos(NS)-\cos(NP)\cos(PS)}{\sin(NP)\sin(PS)}$$

$$\cos P=\frac{-\cos\left(\frac{\pi}{2}-\lambda_N\right)\cos\left(\frac{\pi}{2}-\lambda_S\right)}{\sin\left(\frac{\pi}{2}-\lambda_N\right)\sin\left(\frac{\pi}{2}-\lambda_S\right)}$$

$$\cos P=\frac{-\sin\lambda_N\cdot\sin\lambda_S}{\cos\lambda_N\cdot\cos\lambda_S}$$

In the preferred embodiment, implemented using FORTRAN-77, an arctangent function was used to determine in which of the four quadrants angle P was located.

$$\tan P = \frac{\sin P}{\cos P}$$

$$P = \arctan\left[\frac{\sin P}{\cos P}\right]$$

$$\alpha = P - \psi_N$$
$$\psi_S = 2\pi - \alpha = 2\pi - P + \psi_N$$
$$\psi_S = \psi_N - P$$

The previous calculations establish the aircraft's heading relative to both the North and Sumatran poles. At this point, the initial position and heading are known in both systems.

From the aircraft equations of motion, or an inertial reference unit, the following parameters are available as inputs to the dynamic calculations:

$\theta$=body-axes pitch attitude
$\phi$=body-axes roll attitude
$_N$=body-axes true heading
u=longitudinal body-axes velocity
v=lateral body-axes velocity
w=vertical body-axes velocity Using angle P, as calculated in the manner presented above, an "active" heading angle is used in the body-to-earth cosine matrix, as follows:

The above calculations are used to accommodate the polar navigation of the preferred embodiment of the present invention. The axis transformation and calculations provide continuity during the transition at 45° latitude (north or south), in either direction. By switching coordinate systems at 45° latitude, the error is less than one percent, and no singularities exist over the entire sphere. Using the body-to-earth cosine matrix, $T_{BE}$ based on the Euler angles (O, o, $\phi_P$), calculate the earth axis velocities as follows:

$$\begin{bmatrix} \dot{N} \\ \dot{E} \\ -\dot{h} \end{bmatrix} = T_{BE} \begin{bmatrix} u \\ v \\ w \end{bmatrix}$$

After the above transformations, N-dot and E-dot are relative to the "active" coordinate system, determined by the present latitude (in the traditional system). For latitudes between 45° N and 45° S, a traditional solution for position and heading is used:

$$\lambda_N = \int \dot{N} dt$$

$$P_N = \frac{1}{\cos\lambda_N} \int \dot{E} dt$$

$$h = \int \dot{h} dt$$

$_T$=Ground track angle=arc tan $\dot{E}/\dot{N}$ $V_{GS}$=Ground speed=$(\dot{E}^2+\dot{N}^2)^{\frac{1}{2}}$ $\dot{\lambda}_N = V_{GS}\cdot\cos$ $_T$ $\dot{\rho}_N = V_{GS}\cdot\sin$ $_T$ For higher latitudes, the Sumatran coordinate system is used to determine the dynamic position and heading. Using the current aircraft position in the traditional system, calculate position in the Sumatran system, as was done above:

$$X_N = (R + h_N)\cos\lambda_N\cos\rho_N$$
$$Y_N = (R + h_N)\cos\lambda_N\sin\rho_N$$
$$Z_N = (R + h_N)\sin\lambda_N$$
$$X_S = Z_N$$
$$Y_S = X_N$$
$$Z_S = Y_N$$

$$\left.\begin{aligned} \lambda_S &= \arctan\left[\frac{Z_S}{(X_S^2 + Y_S^2)^{\frac{1}{2}}}\right] \\ \rho_S &= \arctan\left(\frac{Y_S}{X_S}\right) \\ h_S &= h_N \end{aligned}\right\} \text{These are "last frame" values.}$$

Using the "last frame" values of ($\lambda_S$, $\rho_S$),integrate $\dot{N}$ and E from the body-to-earth transformations, to yield a new value for $\lambda_S$ and $\rho_S$:

$$\lambda_S = \int \dot{N} dt$$

$$\rho_S = \frac{1}{\cos\lambda_S} \int \dot{E} dt$$

$$h_S = \int \dot{h} dt$$

Because of the orientation of the Sumatran coordinate system in the traditional polar region, the integration is done within a rectangular grid. These coordinates are then transformed back to the traditional coordinate system:

$$X_S = (R + h_S)\cos\lambda_S\cos\rho_S$$
$$Y_S = (R + h_S)\cos\lambda_S\sin\rho_S$$
$$Z_S = (R + h_S)\sin\lambda_S$$
$$X_N = Y_S$$
$$Y_N = Z_S$$
$$Z_N = X_S$$

$$\lambda_N = \arctan\left[\frac{Z_N}{(X_N^2 + Y_N^2)^{\frac{1}{2}}}\right]$$

$$\rho_N = \arctan\left(\frac{Y_N}{X_N}\right)$$

$$h_N = h_S$$

$$\sin P = \frac{\sin\rho_S}{\cos\lambda_N}$$

$$\cos P = \frac{-\sin\lambda_N\sin\lambda_S}{\cos\lambda_N\cos\lambda_S}$$

$$\cos P = \arctan\left[\frac{\sin P}{\cos P}\right]$$

$$\psi_S = \psi_N - P$$

$$\psi_T = \arctan\left(\frac{\dot{E}}{\dot{N}}\right) + P$$

$$V_{GS} = (\dot{E}^2 + \dot{N}^2)^{\frac{1}{2}}$$
$$\dot{\lambda}_N = V_{GS}\cdot\cos\psi_T$$
$$\dot{\psi}_N = V_{GS}\cdot\sin\psi_T$$

Figure 5:
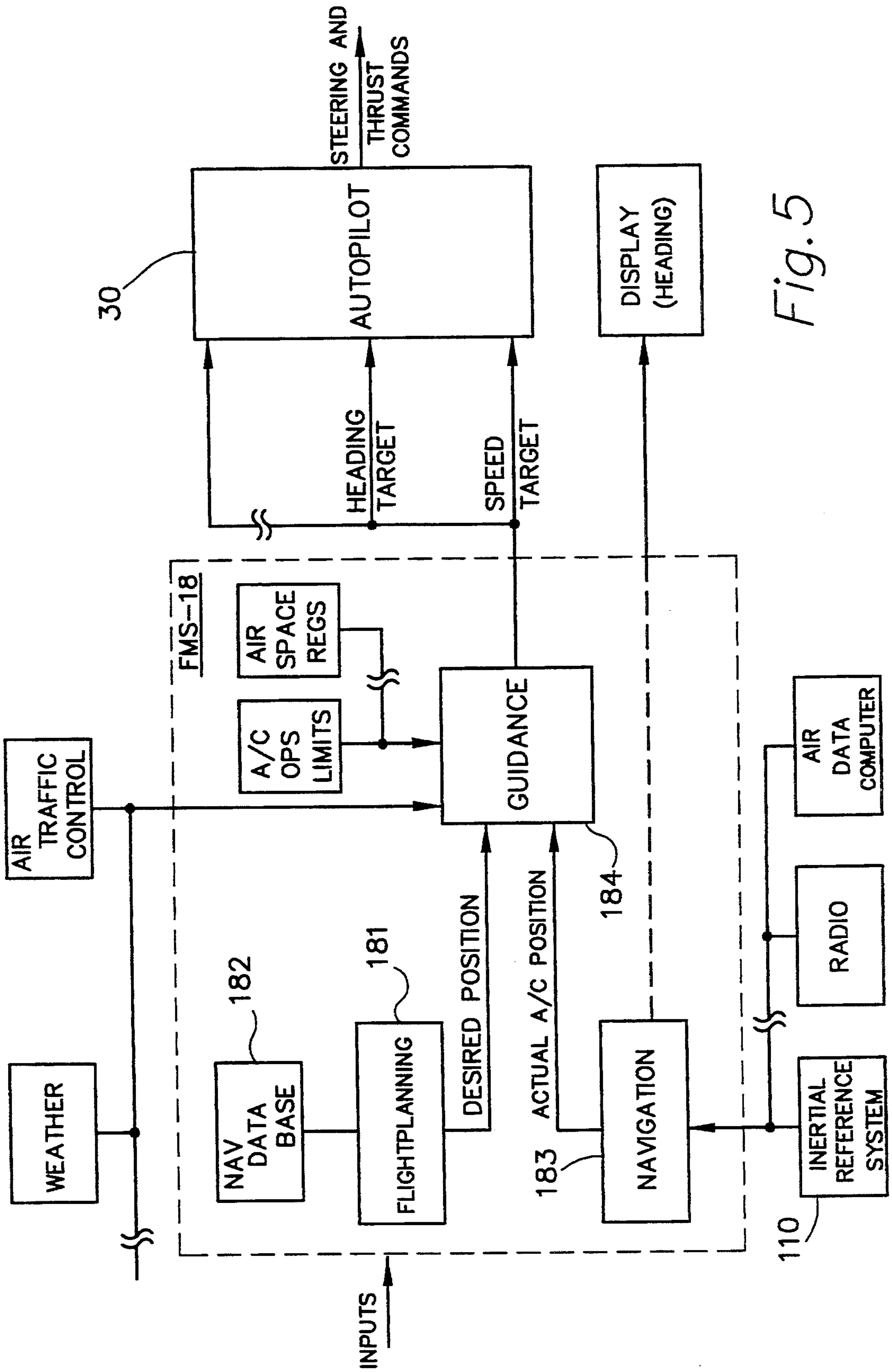
FIG. 5 shows a functional block diagram of a control system of an aircraft which implements the method of the present invention.

Referring to FIG. 5, there is shown a functional block diagram of a Flight Management System (FMS) 18 which can be utilized on an aircraft (A/C) to implement the method of the present invention. Flight planning logic 181 compiles route information from an inputted flight plan. These flight plans are compiled from stored navigational data base 182 and flight crew inputs. During the flight, a navigation system 183 identifies the aircraft position relative to fixed points on the surface of the earth. The various aircraft data, which includes position, speed, heading, altitude, . . . , is computed by a navigation computer (not shown) of the navigation system 183 from data inputted via ground based transponding radios, radar, and aircraft motion sensors of an inertial reference system (IRS) 110. Heading is outputted to a display 31 in the flight deck for the pilot.

The IRS (110) is of particular importance in the polar region since the other inputs are generally unavailable. A guidance system 184, connected to the navigation system 183 and the flight planning logic 181 determines (via a flight management computer, not shown) appropriate target (or target signals), including speed and heading targets required to maintain the current leg of the flight plan. These output parameters of the FMS 18 are determined by a comparison of the actual aircraft position to the destination (or the desired) position determined by the flight planning logic 181. The guidance system 184 outputs the target signals to an autopilot-/autothrottle 30 (sometimes referred to herein simply as autopilot 30). The autopilot 30 controls the aircraft by adjusting the pitch, roll, and yaw control surfaces, and the throttle position to maintain the desired aircraft flight plan governed by the guidance system 184. Of particular interest here is adjusting the primary flight controls (e.g., elevators) and engines (thrust) to control speed and heading.

Figure 6:
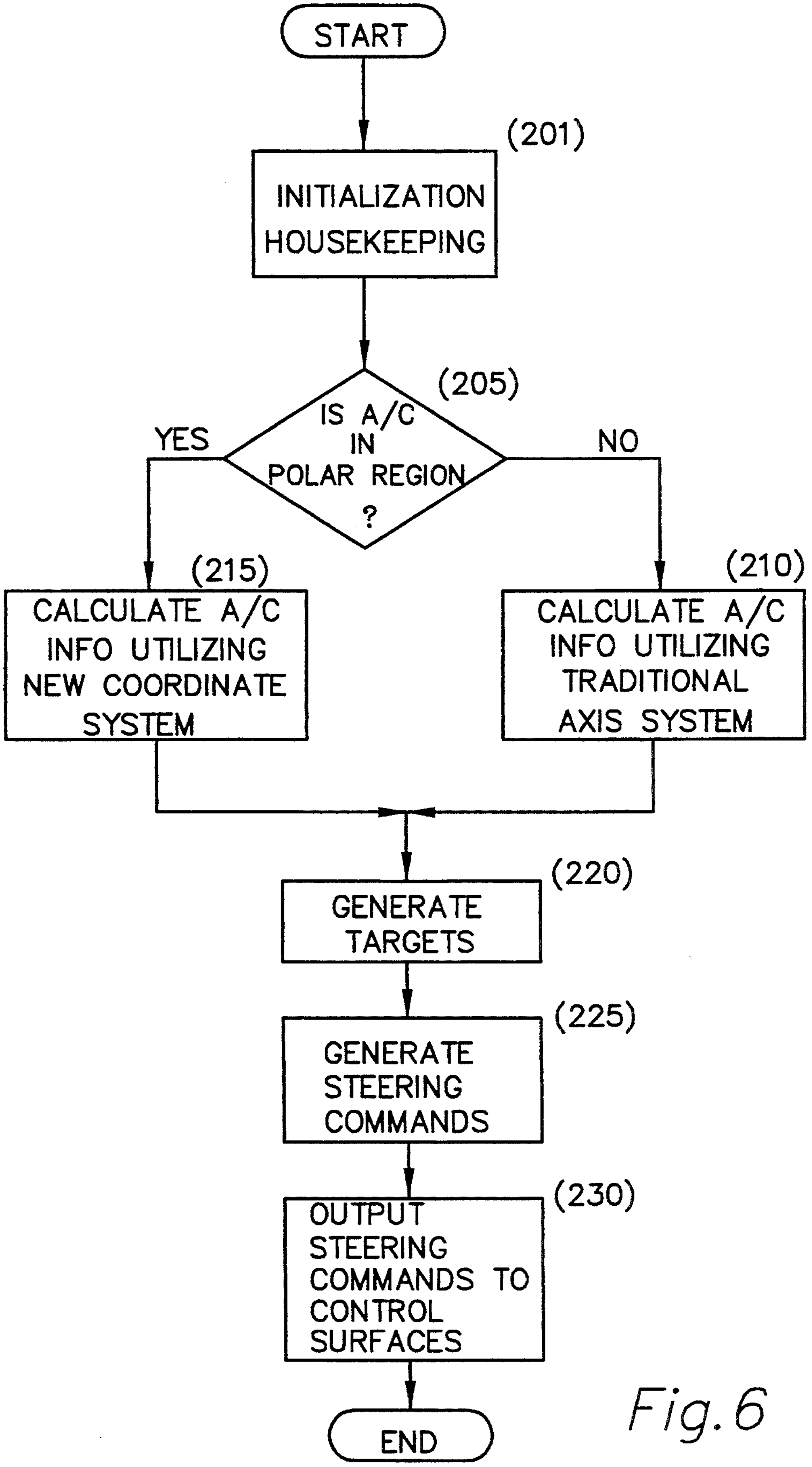
FIG. 6 shows an overview of the method of the preferred embodiment of the present invention.

Referring to FIG. 6, there is shown an overview of the method of the preferred embodiment of the present invention. The inertial reference system 110 senses accelerations and rates of the aircraft motion, specifically rate of change of pitch, roll, and yaw (or heading) and acceleration along the three tradition axes. Position is calculated by integrating the rates. Periodically, this data is inputted to the navigation system 183 (block 201). It will be recognized by those skilled in the art that some of the calculations (such as integrating the rates) can be performed by the IRS 110 or by the navigation system 183. The block 201 is intended to include and initial/preparatory functions and calculations needed to be performed on the data inputted from the IRS 110. A determination is made whether the A/C is in the polar region (block 205) with respect to the traditional axes. In the method of the preferred embodiment, a latitude of greater than 45° north or south is defined as being in the polar region, for the reasons given above. However, it will be understood that the value of latitude selected to be defined as the polar region can vary over a reasonably wide range. If the aircraft is not in the polar region, the standard calculations are made to determine A/C position, heading, velocity, . . . , utilizing the rectangular grid structure of the traditional axes (block 210). If the A/C is in the polar region, the current data is translated to a new coordinate system, the new coordinate system of the preferred embodiment of the present invention being the sumatran coordinate system. A new value of A/C heading and velocity is computed based on past heading and velocity relative to the new coordinate system, the computations having been described above, and is then translated back to the traditional coordinate system (block 215). The actual aircraft position is compared to the desired position to generate target signals (block 220). The target signals are inputted to an autopilot to generate steering commands (block 225), the steering commands being utilized to position the control surfaces of the plane thereby controlling orientation and velocity (block 230) of the aircraft.

The flight management system utilized by the preferred embodiment of the present invention is an FMS model XZY. It will be recognized by those skilled in the art than any number of flight management systems can be utilized. Further, although the method of the preferred embodiment of the present invention rotates the traditional reference system about 2 axes (to maintain the same orthogonal relationship between the axes), it will be recognized by those skilled in the art that only a single rotation about one axis is needed to obtain a rectilinear configuration between the lines of latitude and longitude in the polar region.

The above discussion assumes the a/c is in an automatic flight mode (as is normally in a/c cruise mode). However, as is well understood by those skilled in the art, if the a/c is in manual mode, the commanded parameters, including speed and heading, can be outputted from the FMS to the pilot utilizing the available flight instrumentation, in a manner well known to those skilled in the art, to allow manual control of the a/c by the pilot.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for navigating an aircraft around a polar region of a traditional axis system, the axes of the traditional axis system being in an orthogonal relationship with respect to one another, comprising the steps of:

a) determining if the aircraft is in one of the polar regions of the traditional axis system;

b) if the aircraft is not in one of the polar regions of the traditional axis system, i) calculating aircraft parameters, including aircraft position, speed and heading, relative to the traditional axis system; and ii) proceeding to step d;

c) if the aircraft is in one of the polar regions of the traditional axis systems, i) rotating the traditional axis system to form new axis system, such that the aircraft position in the new axis system is in an essentially rectilinear area of the new axis system, the relationship between the traditional axis system and the new axis system being known;

ii) transforming the aircraft parameters, including said aircraft position, speed, and heading, into the parameters relative to the new axis system;

iii) calculating new parameters with respect to the new axis system based on the transformed aircraft parameters; and iv) translating the new parameters into parameters with respect to the traditional axis system;

d) calculating commands from either the parameters obtained in step (bi) or the new parameters obtained in step (civ);

e) outputting the commands; and f) steering the aircraft in accordance with the commands, the commands having less error as a result of utilizing parameters generated with respect to the new axis system, thereby navigating in the polar region with greater accuracy.

2. A method for navigating an aircraft around a polar region according to claim 1, wherein the polar region of the traditional axis system is a region where the latitude is greater than a predetermined latitude.

3. A method for navigating an aircraft around a polar region according to claim 2, wherein the predetermined latitude is 45 degrees north latitude for a north pole polar region and further wherein the predetermined latitude is 45 degrees south latitude for a south pole polar region.

4. A method for navigating an aircraft around a polar region according to claim 1, wherein the step of rotating comprises the step of:

a) rotating at lease a first axis of the traditional axis system into one of the other axes of the traditional axis system.

5. A method for navigating an aircraft around a polar region according to claim 2, wherein the step of rotating comprises the step of:

a) rotating at lease a first axis of the traditional axis system into one of the other axes of the traditional axis system.

6. A method for navigating an aircraft around a polar region according to claim 1, wherein the step of rotating comprises the step of:

a) rotating a first axis of the traditional axis system into one of the other axes of the traditional axis system; and b) rotating a second axis of the traditional axis system into another one of the other axes of the traditional axis system.

7. A method for navigating an aircraft around a polar region according to claim 2, wherein the step of rotating comprises the step of:

a) rotating a first axis of the traditional axis system into one of the other axes of the traditional axis system; and b) rotating a second axis of the traditional axis system into another one of the other axes of the traditional axis system.

* * * * *